United States Patent [19]

Matsuda

[11] Patent Number: 4,730,156
[45] Date of Patent: Mar. 8, 1988

[54] SELF-MONITOR SYSTEM FOR MICROPROCESSOR FOR DETECTING ERRONEOUS CONNECTION OF TERMINALS

[75] Inventor: Toshiro Matsuda, Sagamihara, Japan

[73] Assignee: Nissan Motor Company, Limited, Yokohama, Japan

[21] Appl. No.: 610,002

[22] Filed: May 14, 1984

[30] Foreign Application Priority Data

Jun. 6, 1983 [JP] Japan ................... 58-99464

[51] Int. Cl.⁴ .................. G01R 31/02; G08B 21/00
[52] U.S. Cl. ......................... 324/73 R; 324/158 R; 340/635; 340/653
[58] Field of Search ............. 324/73 R, 133, 158 R; 340/661, 662, 663, 516, 635, 653, 656; 371/25

[56] References Cited

U.S. PATENT DOCUMENTS

| | | | |
|---|---|---|---|
| 3,891,279 | 6/1975 | Frait | 340/656 |
| 3,991,553 | 11/1976 | Bergey et al. | 340/661 |
| 4,010,456 | 3/1977 | Erni | 340/661 |
| 4,042,832 | 8/1977 | Cassarino, Jr. et al. | 340/653 |
| 4,245,331 | 1/1981 | Hamano et al. | 340/656 |

OTHER PUBLICATIONS

Neil et al; "Designing a ... "; Electronics; Mar. 1, 1979; pp. 122-128.

*Primary Examiner*—Ernest F. Karlsen
*Attorney, Agent, or Firm*—Schwartz, Jeffery, Schwaab, Mack, Blumenthal & Evans

[57] ABSTRACT

A self-monitor system for a microprocessor has one or more specific terminals of an IC package. Predetermined dummy loads are applied to each of the specific terminals in response to the onset of power supply, i.e., during cold start. A self-monitor program is provided among the elements of the microprocessor. The self-monitor program is executed during cold start of the microprocessor to check the status of the specific terminals. Signal levels at the specific terminals are thus checked and compared with reference values representative of the signal levels of the specific terminals when the IC package is correctly connected to the printed circuit board. If the signals levels at one or more specific terminals differ from the reference levels, an alarm is produced to announce erroneous connection of the IC package to the printed circuit board.

10 Claims, 4 Drawing Figures

SELF-MONITOR SYSTEM FOR MICROPROCESSOR FOR DETECTING ERRONEOUS CONNECTION OF TERMINALS

BACKGROUND OF THE INVENTION

The present invention relates generally to a self-monitor system for a microprocessor which generates an alarm when an IC package constituting the microprocessor is erroneously connected to a printed circuit board. More specifically, the invention relates to a microprocessor which can perform a self-check during so-called "cold start" confirming accurate connection of the IC package to the printed circuit board.

In general, the IC package of a microprocessor is connected to a printed circuit board by inserting a plurality of terminals thereof into connector openings of an IC connector socket. The pins of the IC package are arranged in alignment along parallel edges of the base of the IC in the so-called "dual in-line" package arrangement. The IC socket has a plurality of connector openings arranged to match the positions of the IC terminal pins.

It is possible to connect the IC package to the printed circuit board with the IC package reversed so that the pin order is reversed in the socket. In order to prevent this, positioning markers are provided on both the IC package and the IC socket. Although erroneous insertion can be avoided to a large extent by applying such positioning markers, this cannot completely eliminate erroneous insertions due to inadvertent errors of workers. Once the IC package has been erroneously inserted into the IC socket of the printed circuit board, it becomes very difficult to uncover erroneously connected IC packages.

Another common problem concerns more complex systems in which several different IC's are installed to perform a variety of functions. In this case, it is easy to confuse IC packages which are externally identical but which are uniquely programmed for different operations. Thus, for example, a microprocessor IC intended for use in an anti-skid control system might inadvertedly be installed in an IC socket wired into an air conditioning control circuit, and vice versa.

SUMMARY OF THE INVENTION

Therefore, it is an object of the present invention to provide a self-monitor system for a microprocessor which can effectively and successfully detect erroneous connection of the IC package to a printed circuit board after assembly.

Another and more specific object of the present invention is to provide a self-monitor system for a microprocessor which performs a check for erroneous connection of the IC package during cold start of the microprocessor.

Yet another object is to provide a self-monitor which can ensure installation of an IC package into the proper one of several types of IC sockets.

In order to accomplish the above-mentioned and other objects, the self-monitor system for a microprocessor, according to the present invention, selects one or more specific terminals of an IC package. Predetermined dummy loads are applied to each of the specific terminals in response to the onset of power suppy, i.e., during cold start. A self-monitor program is provided among the elements of the microprocessor. The self-monitor program is executed during cold start of the microprocessor to check the status of the specific terminals. Signal levels at the specific terminals are thus checked and compared with reference values representative of the signal levels of the specific terminals when the IC package is correctly connected to the printed circuit board. If the signal levels at one or more specific terminals differ from the reference levels, an alarm is produced to announce erroneous connection of the IC package to the printed circuit board.

BRIEF DESCRIPTION OF THE DRAWINGS

The present invention will be understood more fully from the detailed description given herebelow and from the accompanying drawings of the preferred embodiment of the invention, which, however, should not be taken to limit the invention but are for explanation and understanding only.

In the drawings.

DESCRIPTION OF THE PREFERRED EMBODIMENT

Figure 1A:
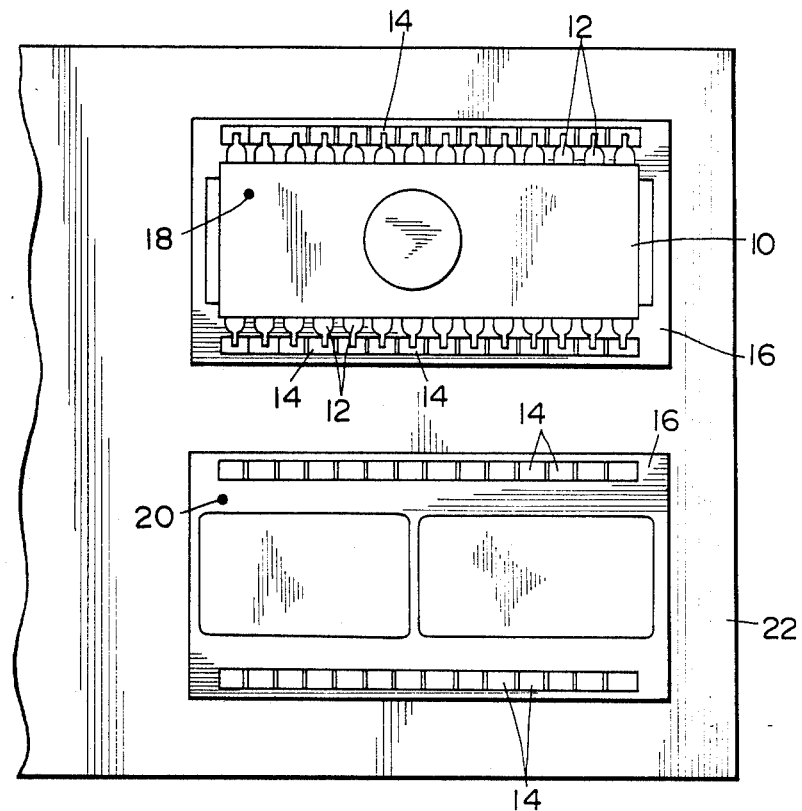
FIGS. 1A and 1B are illustrations of a printed circuit board and an IC package respectively to which the preferred embodiment of a self-monitor system is applied.
Figure 1B:
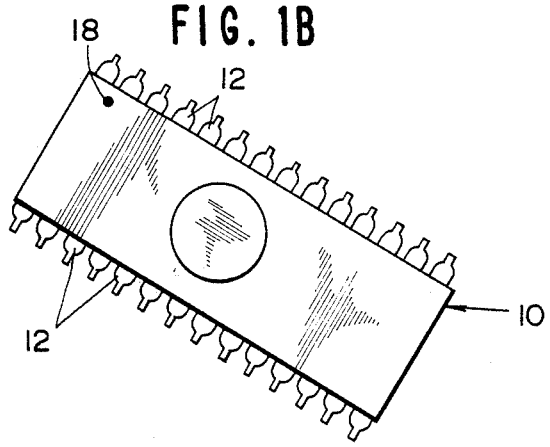

Referring now to the drawings, a plurality of dual in-line terminals 12 protrude from the edges of a dual in-line IC package 10, as shown in FIGS. 1A and 1B. The terminals 12 are arranged along the two parallel longitudinal edges of the IC package 10. The terminals 12 are adapted to be received in connector openings 14 in an IC socket 16 which is designed for dual in-line IC packages. The arrangement of the connector openings 14 matches that of the terminals 12. Positioning markers 18 and 20 are applied to both the IC package 10 and the IC socket 16. The marker 18 on the IC package 10 is located so that IC package 10 is properly connected to a printed circuit board 22 through the IC socket 16 when the marker 18 coincides with the marker 20 of the IC socket 16.

Figure 2:
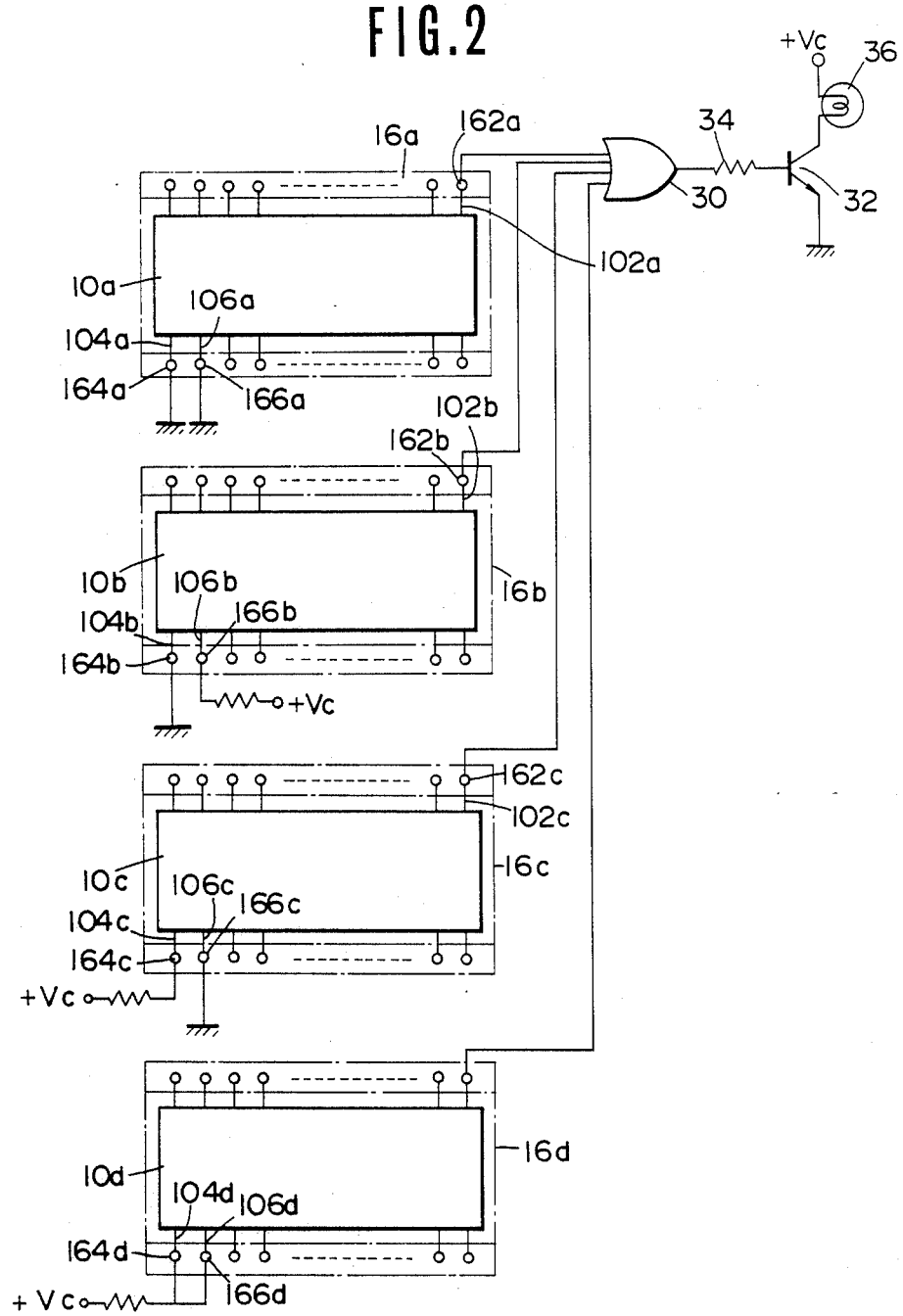
FIG. 2 is a schematic circuit diagram of the self-monitor system according to the present invention.

FIG. 2 shows an example in which four microprocessors encased in separate IC packages 10a, 10b, 10c and 10d are to be installed. The IC packages 10a, 10b, 10c and 10d are inserted into corresponding IC sockets 16a, 16b, 16c and 16d. The IC socket 16a has a terminal 162a connected to an OR gate 30 which is in turn, connected to the base electrode of a switching transistor 32 via a resistor 34. In addition, the IC socket 16a has terminals 164a and 166a connected to ground. Terminals 104a and 106a of the IC package 10a are connected to the terminals 164a and 166a when the IC is properly installed. The terminals 104a and 106a are selected as specific terminals, the signal levels at which are checked during operation of the self-monitor system, and which are not used for other purposes requiring variable signal levels. Since both of the terminals 164a and 166a are grounded, the signal level at the terminals 104a and 106a must be LOW when the IC package 10a is correctly inserted in the IC socket 16a. If a HIGH-level signal is detected at either or both of the terminals 104a and 106a, a HIGH-level error signal is sent via the terminal 162a to the base electrode of the switching transistor 32 to turn the latter ON. An error monitor lamp 36 is turned ON by the switching transistor 32 to announce erroneous installation of the IC package 10a.

Similarly, the IC package 10b has terminals 104b and 106b respectively connected to terminals 164b and 166b of the IC socket 10b. The terminal 162b of the IC socket is connected to the switching transistor 32 via the OR gate 30. The terminal 164b is connected to ground and the terminal 166b is connected to a regulated power source $+V_c$. Therefore, when the IC package 10b is correctly inserted in the IC socket 16b, the signal level at the terminal 104b is LOW and the signal level at the terminal 106b is HIGH. When the signal level at the terminal 104b is HIGH or the signal level at the terminal 106b is LOW, faulty installation of the IC package in the IC socket is detected and thus the HIGH-level error signal is sent to the transistor 32 via the terminal 162b.

The IC package 10c has terminals 104c and 106c connected to the corresponding terminals 164c and 166c. The terminal 162c is connected to the base electrode of the transistor 32. The terminal 164c is connected to the regulated power source $+V_c$. The terminal 166c is connected to ground. Therefore, in the normal state, the signal level at the terminal 104c will always be HIGH and the signal level at the terminal 106c will always be LOW. If this combination of signals is not detected during self-monitor operation, faulty connection of the IC package to the IC socket is recognized.

The IC package 10d also has terminals 104d and 106d respectively connected to terminals 164d and 166d of the IC socket 16d. The terminal 162d of the IC socket 16d is connected to the switching transistor 32 via the OR gate 30. On the other hand, the terminals 164d and 166d are both connected to the regulated power source $+V_c$. Thus, during self-monitor operation, the signal levels at the terminals 104d and 106d should both be HIGH. Otherwise, the IC package 10d is judged to be improperly installed in the IC socket 16d.

Figure 3:
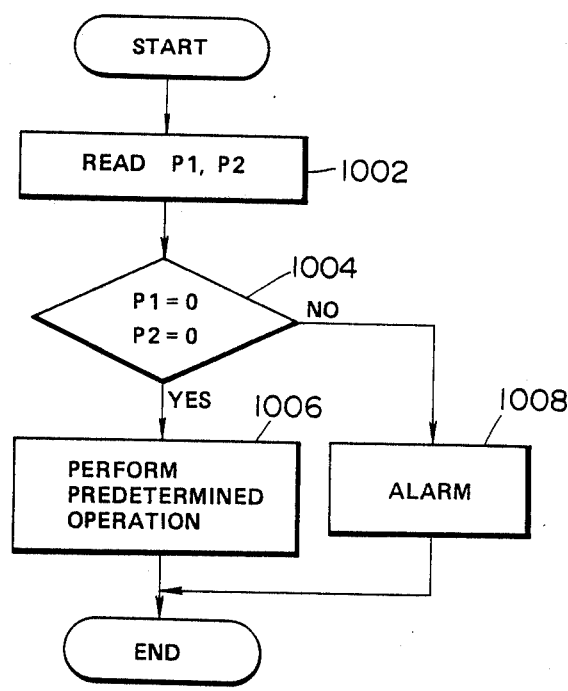
FIG. 3 is a flowchart of a self-monitor program.

FIG. 3 shows a flowchart of the self-monitoring program to be executed by the microprocessors of IC package 10a of FIG. 2. The shown program is adapted to be executed when a power supply switch is turned on and in response to the onset of power supply, i.e. during a cold start. First, the signal levels P1 and P2 at the pins 104a and 106a respectively are compared with reference values which are representative of values present when the IC package 10a is correctly inserted in the IC socket 16a, at a step 1004. As set forth above, since in this case both of the terminals 104a and 106a are grounded via the terminals 164a and 166a, the reference values are both zero (LOW). If zero signal levels are detected at both of the terminals 104a and 106a when checked at the step 1004, the preprogrammed function of the microprocessor such as automotive engine control, anti-skid automotive brake control or the like, can be performed at a step 1006. On the other hand, if one or both of the signals levels P1 and P2 are one (HIGH), faulty connection of the IC package 10a to the IC socket 16a is recognized at the step 1004. In that case, a high-level error signal is generated at a step 1008. The error signal is sent to the transistor 32 via the terminal 162a and OR gate 30. The transistor 32 turns ON in response to the error signal. As a result, the error monitor lamp 34 turns ON to notify the driver or other user of the erroneous connection between the IC package and the IC socket.

It should be appreciated that the self-monitoring procedures for the IC packages 10b, 10c and 10d are substantially same as that described above. It should also be appreciated that, since each socket is identified by an unique combination of fixed signals levels, first, each self-monitor unit must be uniquely programmed and two, the order of installation of the IC packages is foolproofed, for example connection of the IC package 10d to the IC socket 10a can be detected. This will be helpful in cases where each IC package is designed for a different purpose. However, when the IC packages all peform the same operation, the same signal levels and so the same self-monitor software can be used to check all of the microprocessors. In addition, although in the above embodiment, a single, common error monitor lamp is used to indicate faulty connection, separate error monitor lamps can be used to indicate faulty connection of each of the microprocessors. Furthermore, it would be possible, in the case of a microprocessor having a self-monitor for checking various components therefore, such as sensors and/or actuators, error ID data concerning the connection of IC package can be stored in an appropriate area of memory and read out during maintenance.

As set forth above, according to the present invention, erroneous connection of the IC package to the IC socket can be successfully checked after assembly. In addition, since erroneous connection of the IC package to the IC socket can be detected immediately after the onset of power supply, malfunctions due to erroneous connection can be reliably avoided.

What is claimed is:

1. A self-monitor system for indicating an improper connection of an IC package having pins to be connected to a printed circuit board by means of an IC socket having terminals, said IC package including a microprocessor and said system comprising:
  a first means for applying a signal with a predetermined level to a preselected terminal of the IC socket into which a preselected connector pin of the IC package is to be inserted, said preselected terminal and connector pin being utilized only for indicating improper connection of said IC package to said IC socket of said printed circuit board, said predetermined level of said signal being a fixed level;
  a second means, including said microprocessor and responsive to an onset of power, for comparing the signal level at said preselected connector pin with a reference value corresponding to said predetermined level, said second means producing an error signal when the signal level at said preselected connector pin is inconsistent with said reference value thereby indicating an improper connection of said IC package to said IC socket; and
  an error indicator means responsive to said error indicative signal for generating an alarm.

2. The self-monitor system as set forth in claim 1, wherein the signal applied to said preselected terminal of a IC socket is encoded.

3. A method for checking connection of an IC package to an IC socket on a printed circuit board, comprising the steps of:
  selecting a specific connector pin of said IC package;
  applying a signal with a fixed predetermined level to a predetermined terminal of the IC socket into which the specific connector pin is to be inserted, said predetermined terminal and said specific connector pin being utilized only for indicating an improper connection of said IC package to said IC socket of said printed circuit board;

detecting the output level at the specific connector pin;

comparing the detected output level at the specific connector pin with a corresponding reference value; and indicating an erroneous connection of the IC package when the detected output level is not consistent with said reference value.

4. The method as set forth in claim 3, wherein said checking operation is performed during cold start of the microprocessor.

5. The method claim 3, wherein the step of comparing is performed responsive to an ON state of a power supply.

6. A self-monitoring system for a microprocessor encased in an IC package which is connected to a circuit by means of terminals of a corresponding IC socket releasably accommodating connector pins of the IC package comprising:
 (a) at least one first connector pin adapted to receive a specific, fixed signal level;
 (b) a second connector pin for applying an output signal occurring in response to said specific signal level;
 (c) said specific signal level being applied, upon power-up of said circuit, to a first terminal of said IC socket;
 (d) a second terminal of said IC socket connected to an error indicating means for indicating an error in connection of said IC package in response to said output signal; and
 (e) said first connector pin connected to said first terminal and said second connector pin connected to said second terminal when said IC package is inserted into its corresponding IC socket wherein said microprocessor of said IC package is operative for comparing said specific, fixed signal level with a reference level and for generating an output signal only when the specific, fixed level does not correspond to said reference level.

7. A method for monitoring the proper installation of a plurality of IC packages, each having a plurality of connector pins into corresponding IC sockets, each having a plurality of terminals, on a printed circuit board comprising the steps of:
 (a) in response to power-up, generating on said printed circuit board a unique fixed code for each of said IC sockets at a fixed specified group of terminals of each of said IC sockets, said specified group of terminals being the same terminals for each of said sockets and being utilized only for indicating improper connection of said IC packages to said corresponding IC sockets;
 (b) within each IC package, independently comparing the unique, fixed code with unique reference codes generated within each IC package;
 (c) within each IC package, generating an error signal if said unique, fixed codes and said unique reference codes do not coincide wherein an improper connection is indicated; and
 in response to said error signal, providing an indication of the improper connection of said IC package to said IC socket.

8. A system for monitoring the proper installation of a plurality of IC packages each having a plurality of connector pins into corresponding IC sockets each having a plurality of terminals on a printed circuit board comprising:
 (a) means, responsive to power-up of said system, for generating fixed codes, unique for each of said IC sockets at a specified group of terminals of each IC socket, siad terminals being the same terminals of each IC socket;
 (b) each of said IC packages including fixed specified groups of connector pins corresponding to said specified groups of terminals;
 (c) means within each IC package for comparing said fixed code with a unique reference code stored in each IC package;
 (d) means within each IC package for generating an error output signal when said fixed code, unique for each IC socket, does not correspond to said unique reference codes; and
 (e) means responsive to said error output signal to provide an indication that an IC package is inserted into an improper IC socket.

9. A self-monitor system for indicating an improper connection of a plurality of IC packages having pins to be connected to a printed circuit board by means of a plurality of IC sockets having terminals, each IC package including a microprocessor and said system comprising:
 a first means for applying a signal with a predetermined level to a preselected terminal of each IC socket into which a preselected connector pin of each IC package is to be inserted, said preselected terminals and connector pins being utilized only for indicating improper connection of said IC packages to said IC sockets of said printed circuit board, said predetermined level of said signal being a fixed level;
 a second means in each IC package and including said microprocessor of each IC package and responsive to an onset of power, for comparing the signal level at said preselected connector pin with a reference value corresponding to said predetermined level, said second means producing an error signal when the signal level at said preselected connector pin is inconsistent with said reference value thereby indicating an improper connection of said IC package to said IC socket; and
 an error indicator means responsive to said error indicative signal for generating an alarm.

10. A method for checking connection of a plurality of IC packages to a plurality of IC sockets on a printed circuit board, comprising the steps of:
 (a) selecting a specific connector pin of a given IC package;
 (b) applying a signal with a fixed predetermined level to a predetermined terminal of the given IC socket into which the specific connector pin is to be inserted, said predetermined terminal and said specific connector pin being utilized only for indicaing an improper connection of said IC package to said IC socket of said printed circuit board;
 (c) detecting the output level at the specific connector pin;
 (d) comparing the detected output level at the specific connector pin with a corresponding reference value;
 (e) indicating an erroneous connection of the IC package when the detected output level is not consistent with said reference value; and
 (f) repeating steps (a)–(e) for another given one of said plurality of IC packages and IC sockets.

* * * * *